US012583520B2

(12) United States Patent (10) Patent No.: US 12,583,520 B2
Higashihara et al. (45) Date of Patent: Mar. 24, 2026

(54) VEHICLE SKELETON STRUCTURE

(71) Applicant: TOYOTA JIDOSHA KABUSHIKI KAISHA, Toyota (JP)

(72) Inventors: Katsunori Higashihara, Toyota (JP); Daisuke Motoi, Sanda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/078,326

(22) Filed: Mar. 13, 2025

(65) Prior Publication Data

US 2026/0035037 A1 Feb. 5, 2026

(30) Foreign Application Priority Data

Jul. 30, 2024 (JP) ................................. 2024-123499

(51) Int. Cl.
B62D 21/03 (2006.01)
B62D 27/02 (2006.01)
(52) U.S. Cl.
CPC ........... B62D 21/03 (2013.01); B62D 27/023 (2013.01); B62D 27/026 (2013.01)
(58) Field of Classification Search
CPC ...... B62D 21/03; B62D 27/02; B62D 27/023; B62D 27/026
USPC ................ 280/781, 785, 795, 796, 797, 798
See application file for complete search history.

(56) References Cited

U.S. PATENT DOCUMENTS

| | | | | |
|---|---|---|---|---|
| 5,458,393 | A * | 10/1995 | Benedyk | B62D 23/005 |
| | | | | 280/798 |
| 5,964,490 | A * | 10/1999 | Schroeder | B62D 24/00 |
| | | | | 156/92 |
| 2018/0186227 | A1* | 7/2018 | Stephens | B60K 1/04 |
| 2018/0337378 | A1* | 11/2018 | Stephens | B60L 50/66 |
| 2018/0361876 | A1* | 12/2018 | Ruech | B60K 1/04 |
| 2019/0315411 | A1* | 10/2019 | Fischer | B62D 25/2036 |
| 2021/0171123 | A1* | 6/2021 | Kim | B62D 27/023 |
| 2022/0063725 | A1* | 3/2022 | Woo | B62D 21/07 |
| 2022/0363315 | A1* | 11/2022 | Kwon | B60L 50/66 |
| 2023/0062143 | A1* | 3/2023 | Zandbergen | B60K 1/04 |
| 2024/0262422 | A1* | 8/2024 | Garimella | B62D 21/07 |
| 2024/0294060 | A1* | 9/2024 | Harsch | B62D 21/03 |

FOREIGN PATENT DOCUMENTS

| | | | | |
|---|---|---|---|---|
| DE | 19506160 B4 * | 5/2006 | .......... | B62D 29/008 |
| DE | 102018000693 A1 * | 8/2018 | ............ | B62D 21/11 |
| JP | 2023-131343 A | 9/2023 | | |
| JP | 2024-006628 A | 1/2024 | | |

* cited by examiner

*Primary Examiner* — Keith J Frisby
(74) *Attorney, Agent, or Firm* — SoraIP, Inc.

(57) ABSTRACT

The front module and the rear module, which are skeletal components, are assembled to the frame. The frame includes a pair of frame side members, a pair of cross members, and a joint block. The joint block joins the frame side member and the cross member. The joint block includes a cross arm. The cross arm is inserted into the opening of the cross member. Further, the cross arm is provided with an adhesive surface along the vehicle width direction.

5 Claims, 8 Drawing Sheets

VEHICLE SKELETON STRUCTURE

CROSS-REFERENCE TO RELATED APPLICATION

This application claims priority to Japanese Patent Application No. 2024-123499 filed on Jul. 30, 2024. The disclosure of the above-identified application, including the specification, drawings, and claims, is incorporated by reference herein in its entirety.

BACKGROUND

1. Technical Field

The present specification discloses a vehicle skeleton structure.

2. Description of Related Art

Japanese Unexamined Patent Application Publication No. 2023-131343 (JP 2023-131343 A) and Japanese Unexamined Patent Application Publication No. 2024-6628 (JP 2024-6628 A) disclose a frame having a polygonal frame shape. The frame is disposed at the center in the front-rear direction of the vehicle. The frame supports a battery pack.

JP 2023-131343 A and JP 2024-6628 A disclose a frame that is rectangular in plan view. That is, the frame includes a pair of skeletal members arranged in the vehicle width direction. In the following, these skeletal members will be referred to as "side members" as appropriate. The frame further includes a pair of skeletal members arranged in the vehicle front-rear direction. In the following, these skeletal members will be referred to as "cross member" as appropriate. The frame that is rectangular in plan view is assembled by connecting the end portions of the respective skeletal members to each other.

In JP 2023-131343 A and JP 2024-6628 A, the skeletal members are joined to each other via a joint member. The skeletal members are square pipes. The joint member is L-shaped. The joint member is inserted into the end opening of the skeletal member. In JP 2023-131343 A and JP 2024-6628 A, the skeletal members are joined to the joint member by mechanical joining. That is, a fastening hole is drilled in a wall surface of the skeletal member and the joint member. Then, the fastening holes of the two members are aligned. Further, a bolt is screwed into the aligned fastening holes.

SUMMARY

A large skeletal component is occasionally attached to a pair of side members, for example. If there are variations in the dimension of the skeletal component in the vehicle width direction, it may be difficult to attach the skeletal component to the side members. For example, a pair of abutment surfaces to abut against the side members is provided on the skeletal component. At this time, it is difficult to attach the skeletal component to the side members when the distance between the abutment surfaces exceeds the separation distance between the side members.

Thus, the present specification discloses a vehicle skeleton structure capable of accommodating an excess particularly when a skeletal component to be attached to a frame exceeds a prescribed dimension.

The present specification discloses a vehicle skeleton structure. The structure includes a frame and a skeletal component. The frame is polygonal. The skeletal component is assembled to the frame. The skeletal component is integrally molded. The frame includes a pair of side members, a pair of cross members, and a joint block. The side members extend in a vehicle front-rear direction. The side members each have an opening provided in a longitudinal end portion. The cross members extend in a vehicle width direction. The cross members each have an opening provided in a longitudinal end portion. The joint block joins the side member and the cross member. The skeletal component has an abutment surface set for each of the side members. The joint block includes a cross arm. The cross arm is inserted into the opening of the cross member. The cross arm is provided with an adhesive surface along the vehicle width direction.

According to the above configuration, the adhesive surface provided to extend in the vehicle width direction accommodates variations between the abutment surfaces of the skeletal component.

In the above configuration, walls surrounding the opening of the cross member may include a covered surface and an exposed surface. The covered surface may be covered by the skeletal component. An adhesive injection hole may be drilled in the exposed surface.

According to the above configuration, the cross member and the joint block can be bonded and fixed after the frame in a temporarily assembled state is assembled to the skeletal component before the injection of an adhesive.

In the above configuration, the adhesive surface of the cross arm may be provided over an entire circumference of the cross arm. In this case, an injection groove may be provided over an entire circumference in the adhesive surface.

According to the above configuration, an adhesive can be spread over the entire circumference of the adhesive surface by using the injection groove.

In the above configuration, the joint block may include a cross arm. The side arm may be inserted into the opening of the side member. A flat surface may be provided at a bottom portion of the cross arm and the side arm. The flat surface of the cross arm and the flat surface of the side arm may be provided on the same plane.

According to the above configuration, the bottom surfaces of the side arm and the cross arm can be used as reference surfaces (alignment surfaces) for the side member and the cross member.

In the above configuration, the cross arm may include an extension portion. The extension portion may extend from the adhesive surface. A projecting piece may be provided on a lower surface of the extension portion. An insertion hole may be drilled in a bottom wall, of walls surrounding the opening of the cross member. The projecting piece may be insertable into the insertion hole.

According to the above configuration, it is possible to suppress the joint block in a temporarily assembled state falling off from the cross member.

According to the vehicle skeleton structure disclosed in the present specification, an excess can be accommodated particularly when a skeletal component to be attached to a frame exceeds a prescribed dimension.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

FIG. 1 to FIG. 8 illustrate a vehicle bottom structure according to the present embodiment. In FIG. 1 to FIG. 8, the front and rear directions of the vehicles are indicated by FR shafts. The vehicle-width direction is indicated by RW shaft. The vertical is indicated by UP axis. FR shaft has a forward direction. RW shaft shall be rightward in the positive direction. The height direction of UP shaft is the positive direction.

1. Overall Configuration

Figure 1:
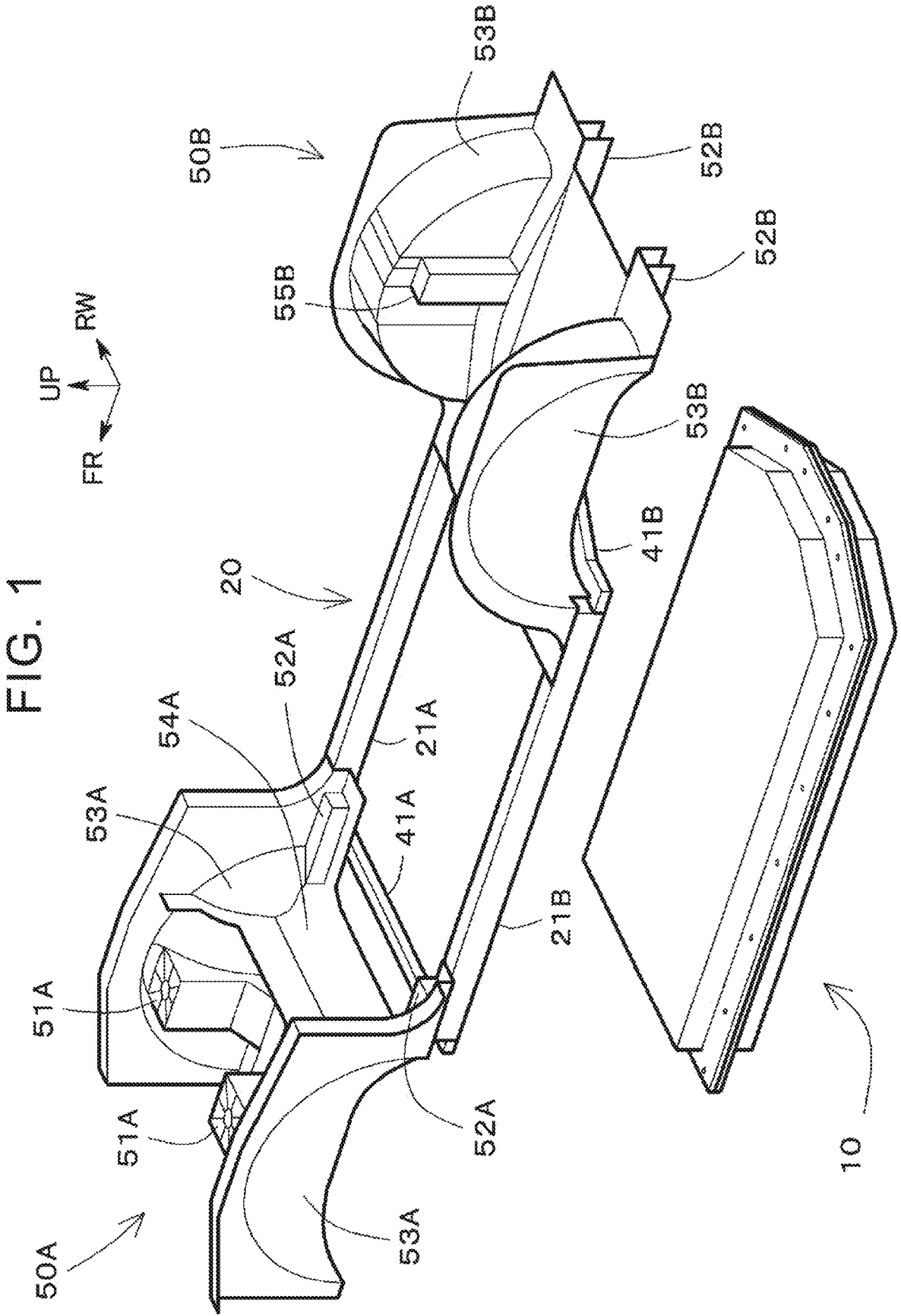
FIG. 1 is a perspective view illustrating a vehicle skeleton structure according to an embodiment.
Figure 2:
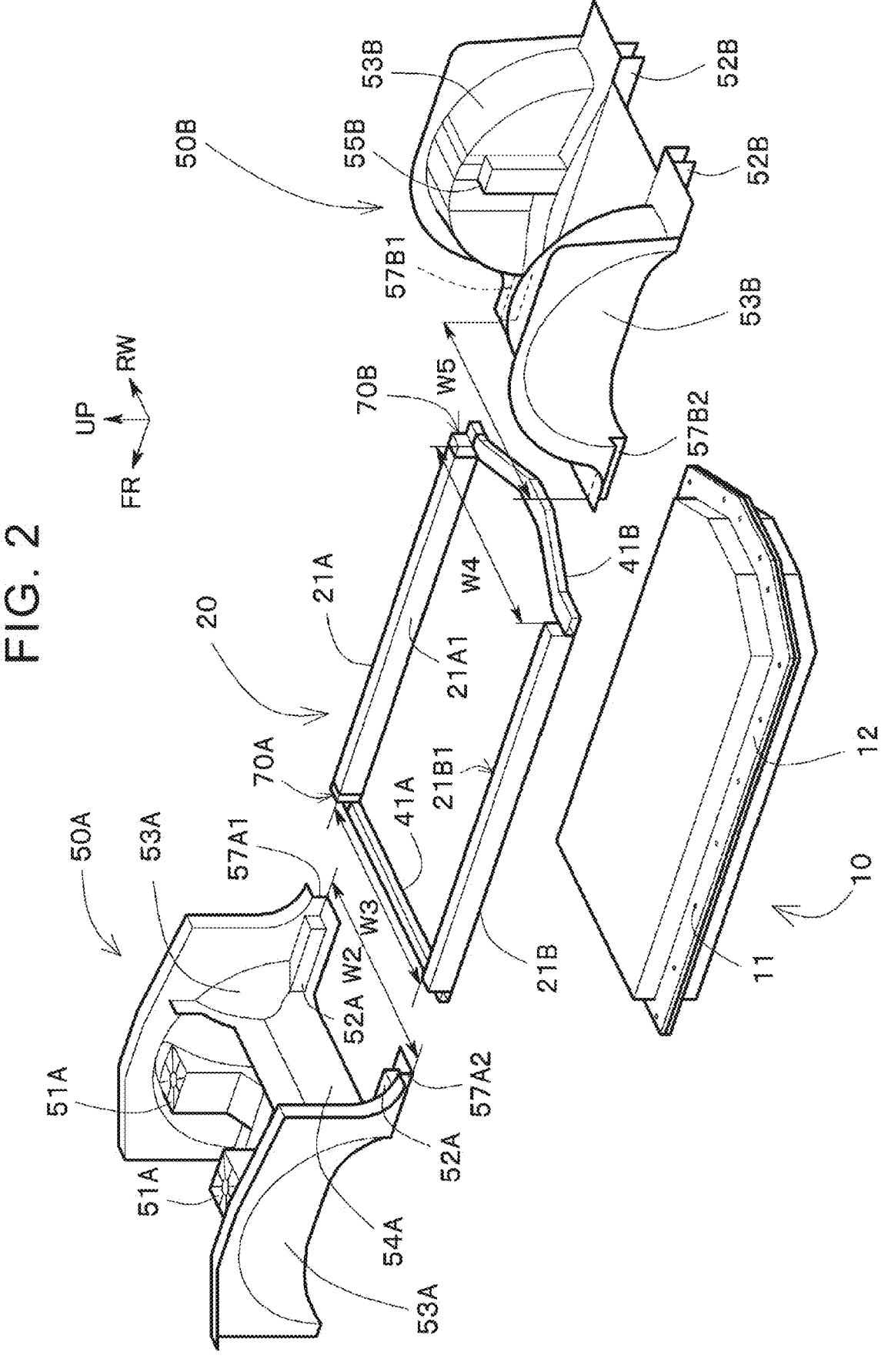
FIG. 2 is an exploded perspective view of the vehicle skeleton structure.

FIG. 1 illustrates a perspective view of a vehicle skeleton structure. FIG. 2 illustrates an exploded perspective view of a vehicle skeleton structure. The vehicle skeleton structure according to the present embodiment is mounted on a battery electric vehicle (BEV). The vehicle skeleton structure according to the present embodiment includes a frame 20, a front module 50A, and a rear module 50B.

The frame 20, the front module 50A, and the rear module 50B are skeletal configurations of the bottom of the vehicle. A battery pack 10 is fastened to the frame 20.

2. Front Module

The front-module 50A is a skeletal component of vehicles. The front-module 50A is an integral part in which the components of the front part of the vehicle are integrated. For example, the front-module 50A is manufactured by aluminum die-casting.

For example, in the front-module 50A, the skeletal component and the panel part are integrally molded. That is, the front module 50A includes a pair of suspension tower 51A, 51A and a pair of front side member 52A, 52A as skeletal components. The front module 50A includes a pair of front wheel house 53A, 53A and a dash panel 54A as panel components.

In addition, an abutment surface 57A1, 57A2 is set at a rear end part of the front-module 50A. The abutment surface 57A1, 57A2 is set for each of the pair of frame side member 21A, 21B. The abutment surface 57A1, 57A2 is a surface facing the vehicle-width-direction outer side. The abutment surface 57A1, 57A2 abuts the inner surface 21A1, 21B1 (see FIG. 2) of the frame 20. In other words, the pair of frame side member 21A, 21B sandwich the abutting surface 57A1, 57A2. In this condition, the abutment surface 57A1 and the inner surface 21A1 and the abutment surface 57A2 and the inner surface 21B1 are welded together. Thus, the front-module 50A and the frame 20 are combined.

The front-module 50A is assembled to the frame 20. As will be described later, a joint-block 70A is used when the abutment surface 57A1 and the inner surface 21A1 are brought into abutment (face-to-face) with each other. That is, an adhesive surface 75A is formed on the cross arm 73A (see FIG. 3) of the joint block 70A. The adhesive surface 75A is formed along the vehicle width-direction. In assembling the frame 20 and the front-module 50A, the depth of insertion of the adhesive surface 75A into the cross-member 41A is adjusted. In this adjustment, the distance-apart W3 (see FIG. 2) of the pair of frame side member 21A, 21B along the vehicle width-direction is adjusted. By this adjustment, variations in the inter-abutment surface distance W2 of the front-module 50A are absorbed.

3. Rear Module

The rear module 50B is a skeletal component of the vehicle. Referring to FIG. 2, the rear module 50B is an integrally molded article in which components of the rear part of the vehicle are integrated. For example, the rear module 50B is manufactured by aluminum die-casting.

For example, in the rear module 50B, the skeletal component and the panel part are integrally molded. That is, the rear module 50B includes a pair of rear side member 52B, 52B as skeletal components. Further, the rear module 50B includes a pair of rear wheel house 53B, 53B as panel components. The rear module 50B also includes a gusset 55B as a reinforcing component.

The rear module 50B is assembled to the frame 20. An abutment surface 57B1, 57B2 is set at the front end of the rear module 50B. The abutment surface 57B1, 57B2 is set for each of the pair of frame side member 21A, 21B. The abutment surface 57B1, 57B2 is a surface facing the vehicle-width-direction outer side. The abutment surface 57B1, 57B2 abuts the inner surface 21A1, 21B1 of the frame 20. The abutment surface 57B1 and the inner surface 21A1 and the abutment surface 57B2 and the inner surface 21B1 are joined by a weld. Accordingly, the rear module 50B and the frame 20 are coupled to each other.

As will be described later, a joint-block 70B is used when the abutment surface 57B1 and the inner surface 21B1 are brought into abutment (face-to-face) with each other. That is, an adhesive surface 75B is formed on the cross arm 73B (see FIG. 4) of the joint block 70B. The adhesive surface 75B is formed along the vehicle width-direction. In assembling the frame 20 and the rear module 50B, the depth of insertion of the adhesive surface 75B into the cross-member 41B is adjusted. In this adjustment, the distance-apart W4 (see FIG. 2) of the pair of frame side member 21A, 21B along the vehicle width-direction is adjusted. By this adjustment, variations in inter-abutment surface distance W5 of the rear module 50B are absorbed.

4. Frame

Referring to FIGS. 1 and 2, the frame 20 is a skeletal component disposed at a center portion in the vehicle front-rear direction. The frame 20 is a polygonal frame in plan view. The frame 20 includes a pair of frame side member 21A, 21B. The frame 20 includes a pair of cross-member 41A, 41B. Further, the frame 20 includes a joint-block 70A, 70B.

The pair of frame side members 21A, 21B extend in the front-rear direction of the vehicle. Further, the pair of frame side member 21A, 21B is formed with an opening at the longitudinal end portion. For example, referring to FIGS. 3 and 4, an opening 28A, 28B is formed at the front and rear ends of the frame side member 21A. The opening at the front and rear ends of the frame side member 21B is scaled by an end plate 82A, 82B. For example, the pair of frame side member 21A, 21B is composed of square pipes.

Figure 3:
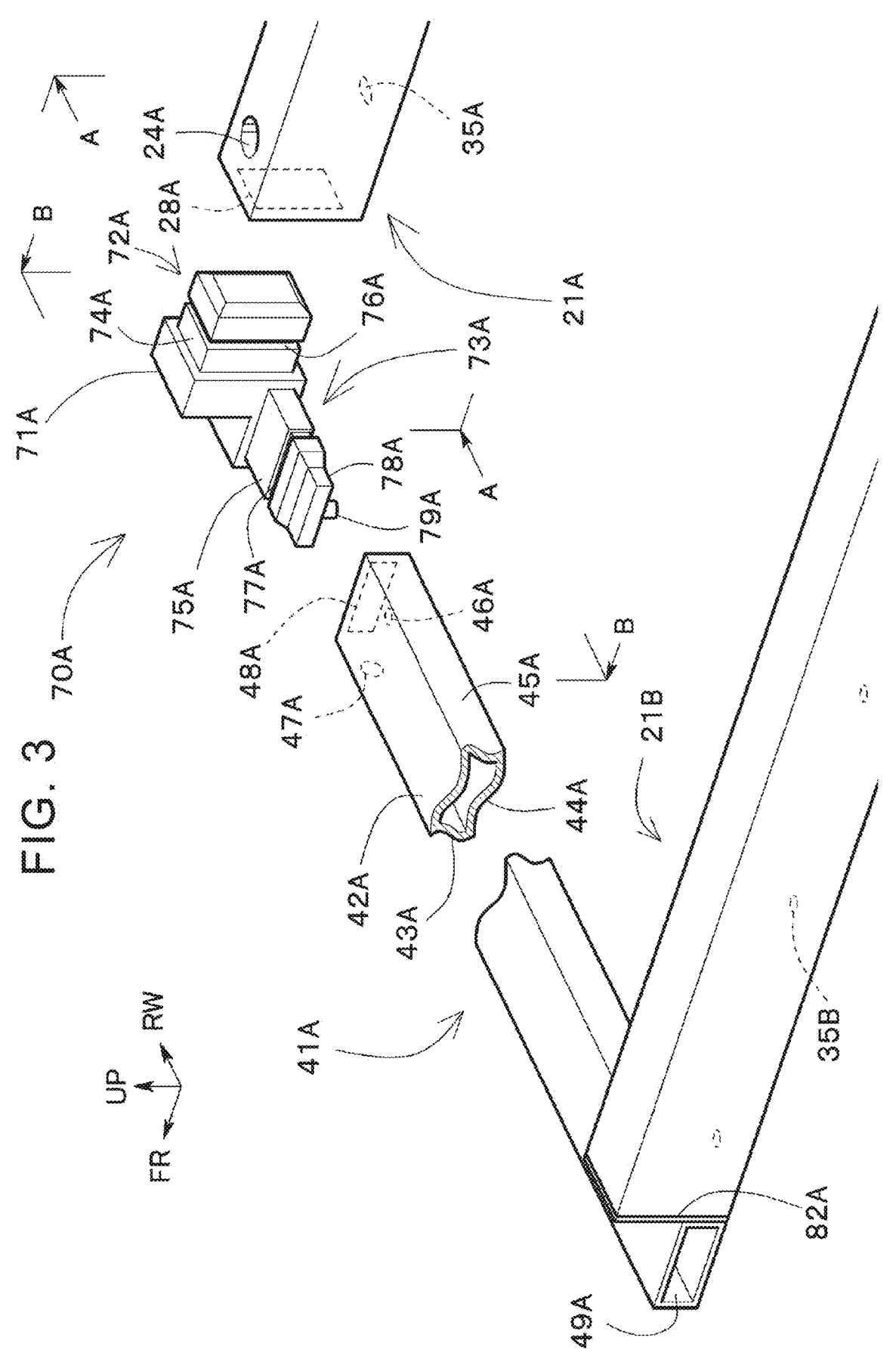
FIG. 3 is an exploded perspective view of the frame front portion.

Referring to FIG. 3, a plurality of fastening hole 35B are drilled in the bottom wall of the frame side member 21B. The fastening hole 35B is aligned with the fastening hole 11 of the battery pack 10 (see FIG. 2). Further, the battery pack 10 is fastened to the frame side member 21B by bolt-nut fastening.

Figure 4:
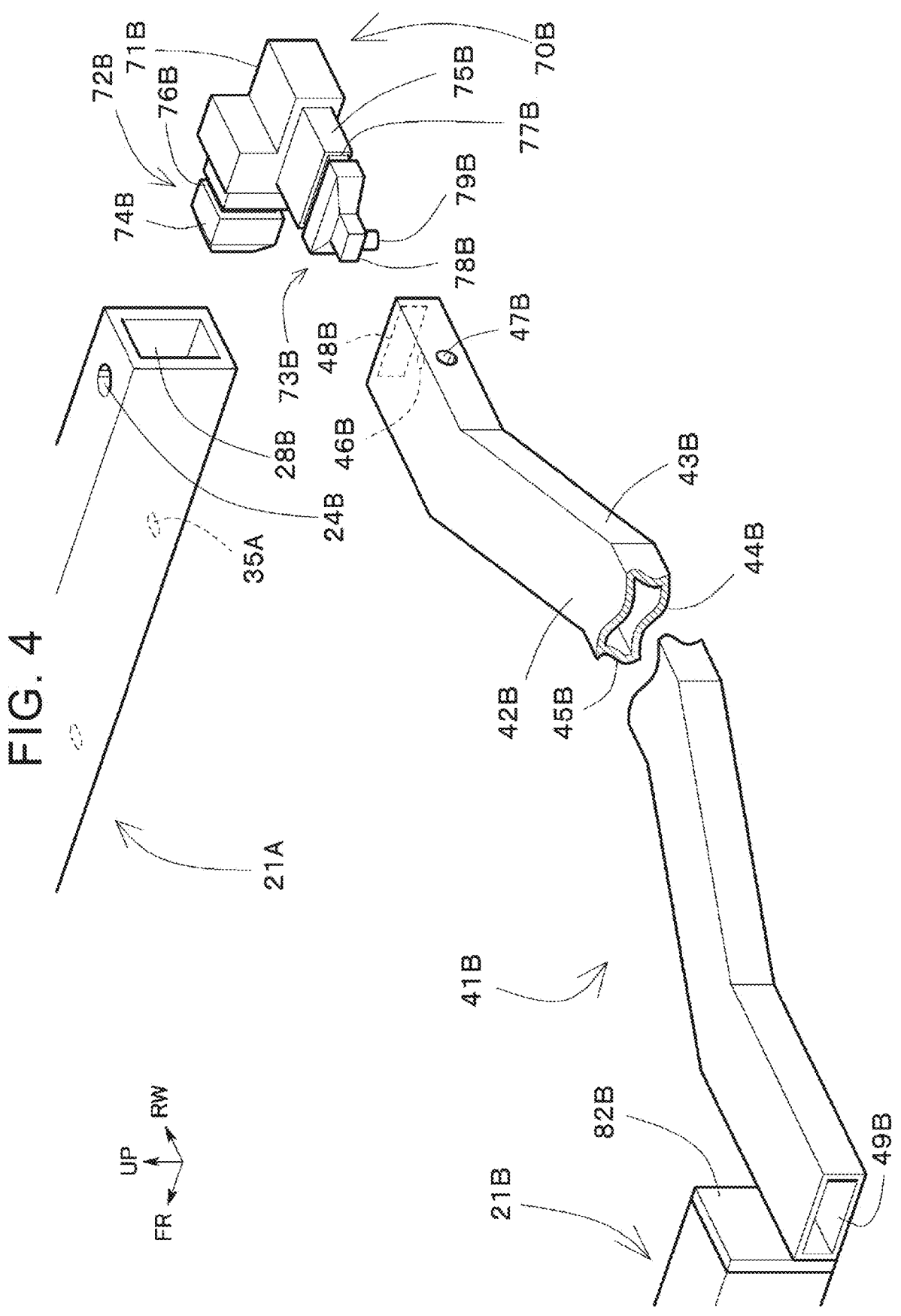
FIG. 4 is an exploded perspective view of the frame rear portion.

The front end of the frame side member 21B is joined to the left end of the cross member 41A. For example, both are welded. In FIG. 3, a part of the cross-member 41A is omitted. Referring also to FIG. 4, the rear end of the frame side member 21B is joined to the left end of the cross member 41B. In FIG. 4, a part of the cross-member 41B is omitted. The rear end of the frame side member 21B and the left end of the cross member 41B are welded, for example. By this joining, a C-shaped subassembly is formed by the frame side member 21B and the cross member 41A, 41B.

As will be described later, the frame side member 21B, the C-shaped subassembly formed by the cross-member 41A, 41B, and the frame side member 21A are bonded to each other with an adhesive via the joint block 70A, 70B. During this joining, the distance between the subassembly and the frame side member 21A along the vehicle-width direction is adjusted by the joint-block 70A, 70B.

Referring to FIGS. 3 and 4, an injection hole 24A is drilled in the front end of the frame side member 21A. In addition, an injection-hole 24B is drilled in the rear end of the frame side member 21A. For example, an injection hole 24A, 24B is drilled in the upper wall of the frame side member 21A.

Further, referring to FIG. 4, a plurality of fastening hole 35A are drilled in the bottom wall of the frame side member 21A. According to the vehicle-width-direction adjusting function of the joint-block 70A, 70B, which will be described later, the fastening hole 35A may be a long hole. For example, the fastening hole 35A has a long-axis diameter along the vehicle-width direction.

The cross-member 41A, 41B extends across the vehicle. Referring to FIG. 3, the cross-member 41A comprises an opening 48A, 49A at the longitudinal end. That is, the cross-member 41A includes opening 48A, 49A at both vehicle-width-direction ends. Referring to FIG. 4, the cross-member 41B comprises an opening 48B, 49B at the longitudinal end. That is, the cross-member 41B includes opening 48B, 49B at both vehicle-width-direction ends. For example, the cross-member 41A, 41B is composed of square pipes.

Figure 7:
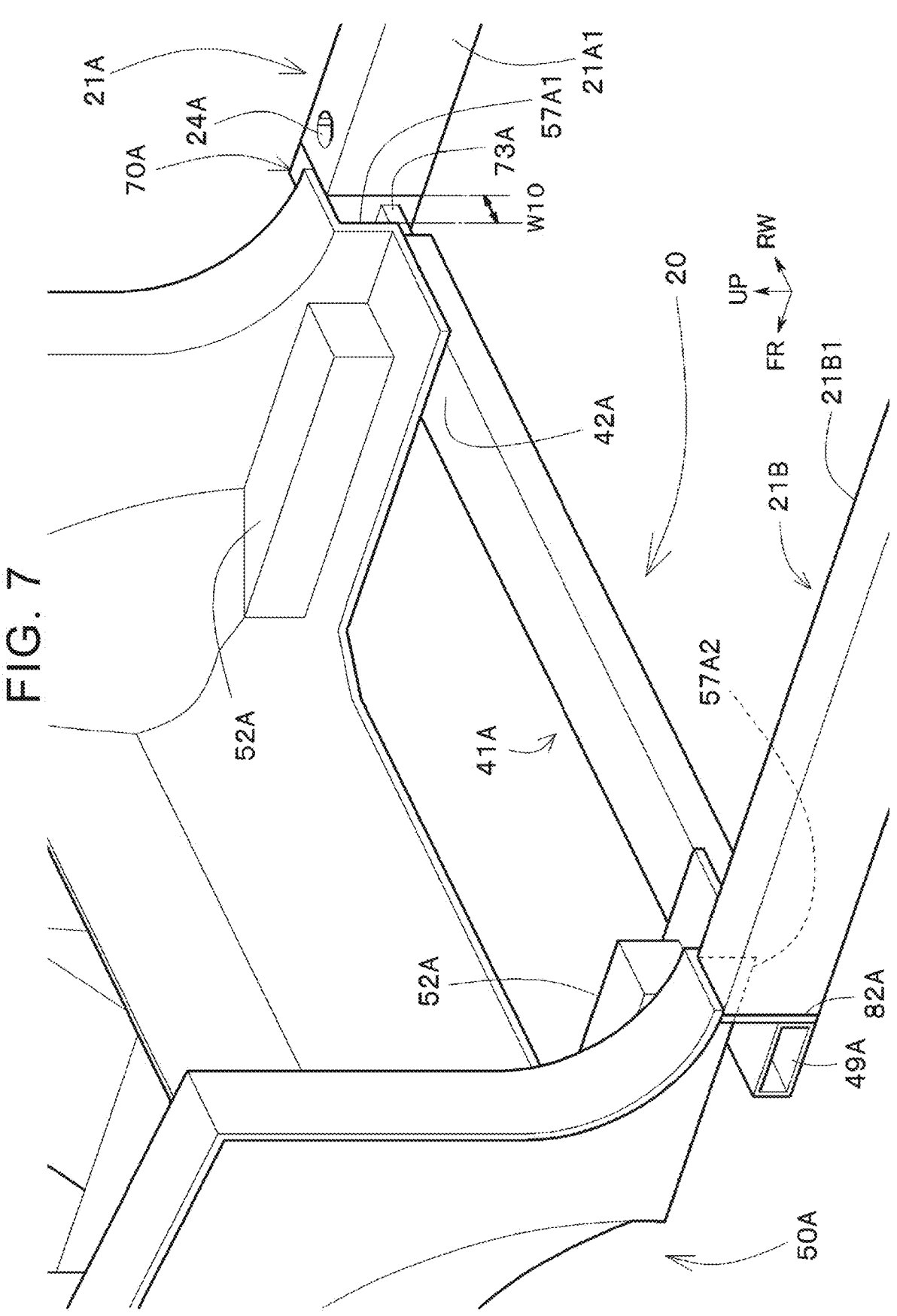
FIG. 7 is a diagram illustrating a vehicle skeleton structure in a temporary frame condition.

Referring to FIG. 3, a wall of the cross-member 41A surrounding the opening 48A includes a covered surface 42A and an exposed surface 43A, 44A, 45A. As illustrated in FIG. 7, when the front module 50A is assembled to the frame 20, the covered surface 42A is covered with a front module 50A (skeletal component). The exposed surface 43A, 44A, 45A (see FIG. 3) is exposed to the front module 50A when the front module 50A is assembled to the frame 20.

Any of the exposed surface 43A, 44A, 45A is perforated with an injection-hole 47A. For example, an injection hole 47A is drilled in an exposed surface 43A which is a front surface of the cross-member 41A. The injection hole 47A is formed in the vicinity of the right end opening 48A of the cross member 41A.

In addition, a plug-in hole 46A is drilled in a bottom wall of the cross-member 41A. The insertion hole 46A is formed in the vicinity of the right end opening 48A of the cross member 41A.

As will be described later, the adhesive 90 (see FIG. 8) is injected from the injection hole 47A. In order to suppress the outflow of the adhesive 90, the injection hole 47A and the insertion hole 46A are offset in the vehicle-width direction. For example, the insertion hole 46A is disposed closer to the opening 48A than the injection hole 47A.

Referring to FIG. 4, a wall of the cross-member 41B surrounding the opening 48B includes a covered surface 42B and an exposed surface 43B, 44B, 45B. Any of the exposed surface 43B, 44B, 45B is perforated with an injection-hole 47B. For example, an injection-hole 47B is drilled in an exposed surface 43B which is a rear surface of the cross-member 41B. The injection hole 47B is formed in the vicinity of the right end opening 48B of the cross member 41B.

In addition, a plug-in hole 46B is drilled in a bottom wall of the cross-member 41B. The insertion hole 46B is disposed closer to the opening 48B than the injection hole 47B.

Referring to FIG. 3, the joint block 70A connects the front end of the frame side member 21A and the right end of the cross member 41A. Referring to FIG. 4, the joint block 70B connects the rear end of the frame side member 21A and the right end of the cross member 41B. The joint-block 70A, 70B is made of a metallic material. For example, the joint-block 70A, 70B is manufactured by aluminum die-casting.

Referring to FIG. 3, the joint-block 70A is an L-shaped part in a plan view. The joint-block 70A includes a base 71A, a side-arm 72A, and a cross-arm 73A. A side arm 72A extends rearward from the base 71A. A cross-arm 73A extends from the base 71A to the vehicle-width-direction inner side.

The cross-sectional shape of the side arm 72A conforms to the cross-sectional shape of the frame side member 21A. For example, the cross-section of the side arm 72A is rectangular. The size of the side arm 72A is smaller than the width and height of the opening 28A of the frame side member 21A in both width and height. That is, the side arm 72A is inserted into the opening 28A.

Similarly, the cross-sectional shape of the cross-arm 73A conforms to the cross-sectional shape of the cross-member 41A. For example, the cross-section of the cross-arm 73A is rectangular. The cross arm 73A has a width and a height both smaller than the width and the height of the opening 48A of the cross member 41A. That is, the cross-arm 73A is inserted into the opening 48A.

The side arm 72A and the cross arm 73A include an adhesive surface 74A, 75A. For example, the outer peripheral surfaces of the side arm 72A and the cross arm 73A have an adhesive surface 74A, 75A over the entire surface. Adhesive 90 (see FIGS. 5 and 8) is injected into the adhesive surface 74A, 75A. In addition, an injection groove 76A, 77A is formed on the adhesive surface 74A, 75A. The injection groove 76A, 77A is formed over the entire circumference of the side arm 72A and the cross arm 73A. Further, for example, the injection groove 76A is formed at the center of the adhesive surface 74A in the front-rear direction. In a similar manner, the injection groove 77A is formed in the vehicle-width-direction center of the adhesive surface 75A.

The adhesive surface 74A of the side arm 72A extends in the front-rear direction of the vehicle. For example, in the frame side member 21A, 21B, tolerances are determined with respect to the entire length along the front-rear direction of the vehicle. Vehicle-front-rear dimensions of the adhesive surface 74A are determined so as to have a length equal to or less than twice this tolerance. That is, the adhesive surface 75A absorbs variations in the overall length of the frame side member 21A, 21B.

The adhesive surface 75A of the cross arm 73A extends in the vehicle-width direction. For example, tolerances are defined for the inter-abutment surface distance W2 of the front-module 50A (see FIG. 2). The width-direction dimension of the adhesive surface 75A is determined so as to be equal to or less than twice the length of the tolerances. That is, the adhesive surface 75A absorbs variations in inter-abutment surface distance W2.

It is assumed that the inter-abutment surface distance W2 is 1800 mm in the design-value. The dimensional tolerances of the castings are defined by JISB0403:1995. According to this, the most stringent tolerance rating for castings with 1800 mm design-value dimensions is CT7. According to CT7, the dimensional tolerances are defined in 2.6 mm. Therefore, the vehicle-width-direction dimension of the adhesive surface 75A is determined to be, for example, equal to or larger than 3.0 mm and equal to or smaller than 6.0 mm.

The cross-arm 73A also includes an extension portion 78A. The extension portion 78A extends further inward from the adhesive surface 75A. A protruding piece 79A is formed on a lower surface of the extension portion 78A. As will be described later, when the front-module 50A and the frame 20 are assembled, the protruding piece 79A is inserted into the insertion hole 46A.

Referring to FIG. 4, the joint block 70B basically has the same construction as the joint block 70A. The joint-block 70B is an L-shaped part in plan view. The joint-block 70B includes a base 71B, a side-arm 72B, and a cross-arm 73B. A side arm 72B extends forward from the base 71B. A cross-arm 73B extends from the base 71B to the vehicle-width-direction inner side.

The cross-sectional shape of the side arm 72B conforms to the cross-sectional shape of the frame side member 21A. For example, the cross-section of the side arm 72B is rectangular. The size of the side arm 72B is smaller than the width and height of the opening 28B of the frame side member 21A in both width and height. That is, the side arm 72B is inserted into the opening 28B.

Similarly, the cross-sectional shape of the cross-arm 73B conforms to the cross-sectional shape of the cross-member 41B. For example, the cross-section of the cross-arm 73B is rectangular. The cross arm 73B has a width and a height both smaller than the width and the height of the opening 48B of the cross member 41B. That is, the cross-arm 73B is inserted into the opening 48B.

The side arm 72B and the cross arm 73B include an adhesive surface 74B, 75B. For example, the outer peripheral surfaces of the side arm 72B and the cross arm 73B have an adhesive surface 74B, 75B over the entire surface. Adhesive 90 (see FIGS. 5 and 8) is injected into the adhesive surface 74B, 75B. In addition, an injection groove 76B, 77B is formed on the adhesive surface 74B, 75B. The injection groove 76B, 77B is formed over the entire circumference of the side arm 72B and the cross arm 73B. Further, for example, the injection groove 76B is formed at the center of the adhesive surface 74B in the front-rear direction. In a similar manner, the inlet channel 77B is formed in the vehicle-width-direction center of the adhesive surface 75B.

The adhesive surface 74B of the side arm 72B extends in the front-rear direction of the vehicle. For example, tolerances are defined for the entire length of the frame side member 21A, 21B along the front-rear direction of the vehicle. Vehicle-front-rear dimensions of the adhesive surface 74B are determined so as to have a length equal to or less than twice this tolerance.

The adhesive surface 75B of the cross arm 73B extends in the vehicle-width direction. For example, tolerances are defined for the inter-abutment surface distance W5 of the rear module 50B (see FIG. 2). The width-direction dimension of the adhesive surface 75B is determined so as to be equal to or less than twice the length of the tolerances.

The cross-arm 73B also includes an extension portion 78B. The extension portion 78B extends further inward from the adhesive surface 75B. A protruding piece 79B is formed on a lower surface of the extension portion 78B. As will be described later, when the rear module 50B and the frame 20 are assembled, the protruding piece 79B is inserted into the insertion hole 46B.

5. Assembly Process of Skeletal Structure

Figure 5:
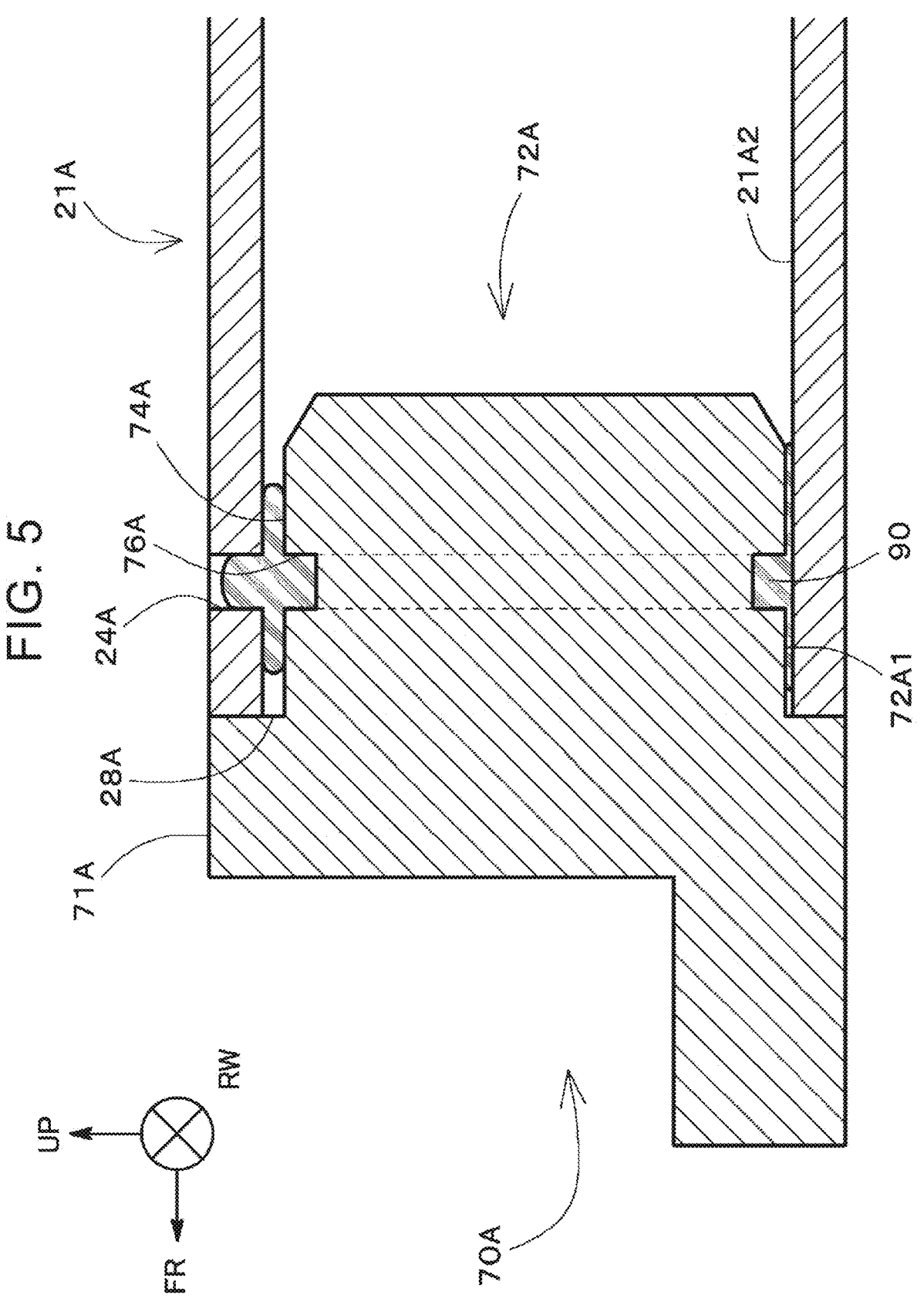
FIG. 5 is a cross-sectional A-A view of FIG. 3.

FIGS. 5-8 illustrate an assembly process of a vehicle skeleton structure. Referring to FIG. 5, the side arm 72A of the joint block 70A is inserted into the opening 28A. The side arm 72A is inserted into the frame side member 21A over the entire length. For example, the side arm 72A is inserted into the frame side member 21A until the end of the opening 28A abuts against the base 71A.

Further, the adhesive 90 is injected from the injection hole 24A. Adhesive 90 is injected over the entire circumference of the side arm 72A along the injection groove 76A. As illustrated in FIG. 5, the opening 28A is sealed by the adhesive 90 and the side arm 72A.

Here, the bottom surface 72A1 of the side arm 72A is a flat surface. The bottom surface 72A1 is in contact with the bottom surface 21A2 of the frame side member 21A. As will be described later, the bottom surface 72A1 of the side arm 72A serves as a control surface for managing the height differences between the frame side member 21A and the cross member 41A, 41B.

Similar to the joint block 70A, the side arm 72B of the joint block 70B (see FIG. 4) is inserted into the opening 28B. The side arm 72B is inserted into the frame side member 21A over the entire length.

Further, the adhesive 90 (see FIG. 5) is injected from the injection hole 24B. Adhesive 90 is injected over the entire circumference of the side arm 72B along the injection groove 76B. The opening 28B is sealed by the adhesive 90 and the side arm 72B.

Further, the bottom surface of the side arm 72B is a flat surface, and is in contact with the inner bottom surface of the cylinder of the frame side member 21A. As will be described later, the bottom surface of the side arm 72B serves as a control surface for managing height differences between the frame side member 21A and the cross member 41A, 41B.

Figure 6:
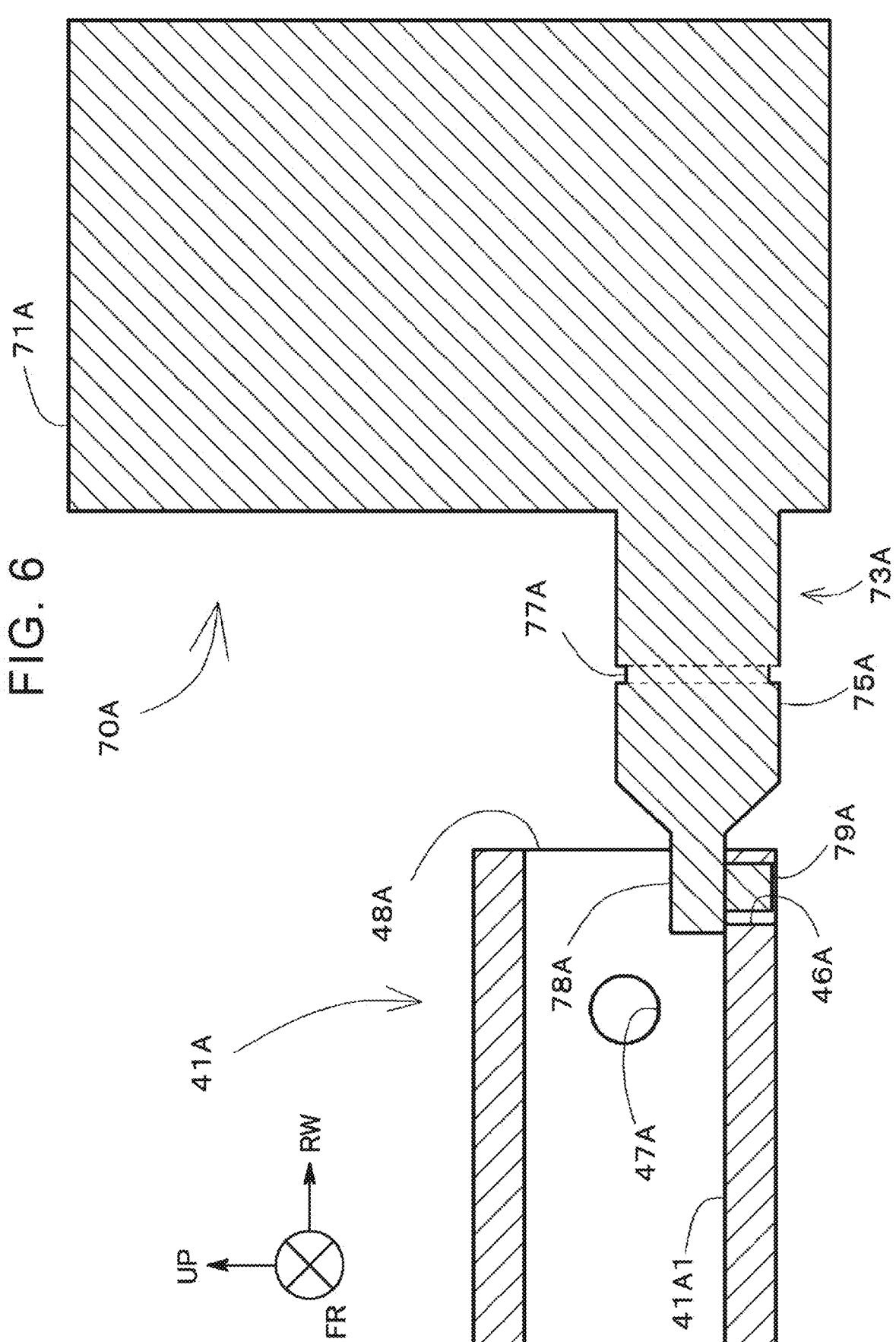
FIG. 6 is a cross-sectional view of B-B of FIG. 3 in a pre-assembled condition.

Referring to FIG. 6, the protruding piece 79A of the joint-block 70A is inserted into the insertion hole 46A. Thus, the joint block 70A and the frame side member 21A (see FIG. 3) are temporarily fastened to the cross member 41A. Similarly, the protruding piece 79B of the joint-block 70B (see FIG. 4) is inserted into the insertion hole 46B. Thus, the joint block 70B and the frame side member 21B are temporarily fastened to the cross member 41B.

Referring to FIG. 7, the front-module 50A is placed on the temporarily fastened frame 20. In the same manner, the rear module 50B (see FIG. 2) is placed on the temporarily fastened frame 20. Referring to FIGS. 2 and 7, the front module 50A and the rear module 50B and the frame side member 21B are positioned. In this positioning, the abutment surface 57A2 of the front module 50A and the abutment surface 57B2 of the rear module 50B abut the inner surface 21B1 of the frame side member 21B.

Referring to FIG. 7, as shown in the gap W10, the abutment surface 57A1 and the inner surface 21A1 of the frame side member 21A are separated from each other. In the same manner, the abutment surface 57B1 (see FIG. 2) and the inner surface 21A1 are spaced apart from each other along the vehicle width-direction.

Figure 8:
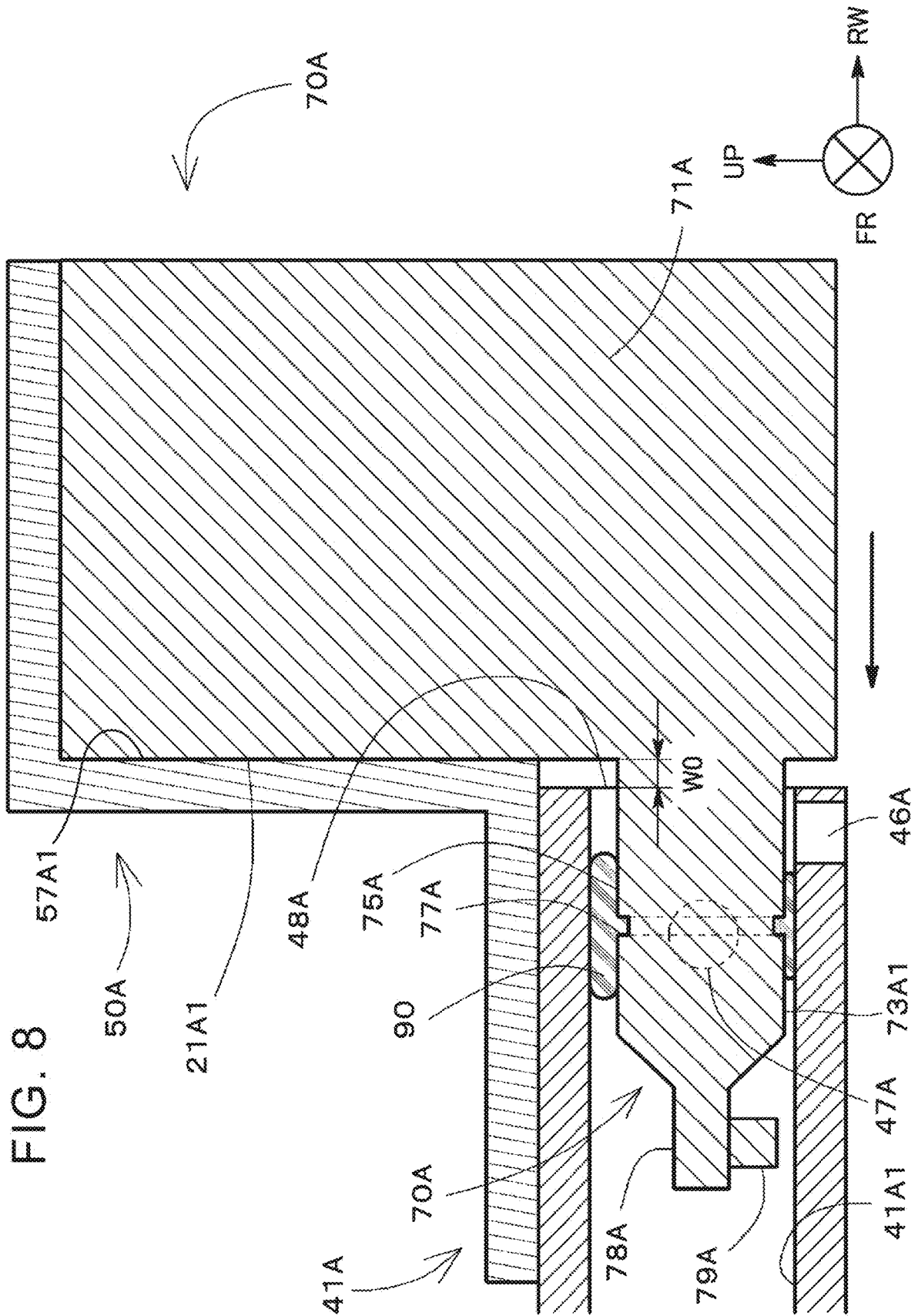
FIG. 8 is a cross-sectional view of B-B of FIG. 3 illustrating the assembly process of the vehicle skeleton structure.

Referring to FIG. 6, the cross-arm 73A is gradually inserted into the cross-member 41A. Referring to FIG. 8, the cross-arm 73A is inserted into the cross-member 41A until the abutment surface 57A1 and the inner surface 21A1 of the frame side member 21A are abutted.

Referring also to FIG. 4, the cross-arm 73B is gradually inserted into the cross-member 41B. Referring to FIG. 8, the cross-arm 73A is inserted into the cross-member 41A until the abutment surface 57A1 and the inner surface 21A1 of the frame side member 21A are abutted. Similarly, the cross-arm 73B is inserted into the cross-member 41B until the abutment surface 57B 1 (see FIG. 2) and the inner surface 21B1 of the frame side member 21B are abutted.

The assembling step may be performed prior to curing of the adhesive 90 injected into the adhesive surface 74A, 74B of the side arm 72A, 72B. When the frame side member 21A, 21B varies in the front-rear direction, the side arm 72A, 72B moves relative to the frame side member 21A. That is, the variation in the size of the frame side member 21A, 21B is absorbed by the adhesive surface 74A, 74B of the side arm 72A, 72B.

Referring to FIGS. 4 and 8, the adhesive 90 is injected from the injection hole 47A, 47B. The adhesive 90 is filled along the entire circumference of the adhesive surface 75A, 75B along the injection groove 77A, 77B. As shown in the gap W0 of FIG. 8, when the inter-abutment surface distance W2 (see FIG. 2) exceeds the specified width, the adhesive surface 75A absorbs the excess.

The bottom surface 73A1 of the cross arm 73A and the bottom surface 72A1 of the side arm 72A are formed on the same surface. Similarly, the bottom surface of the cross-arm 73B and the bottom surface of the side arm 72B are also formed on the same surface. As illustrated in FIG. 8, the cylinder inner bottom surface 41A1 of the cross member 41A and the bottom surface 73A1 of the cross arm 73A are brought into contact with each other. Still referring to FIG. 5, the bottom surface 72A1 of the side arm 72A and the cylinder inner bottom surface 21A2 of the frame side member 21A are brought into contact with each other. At this time, the relative heights of the frame side member 21A and the cross member 41A are set to the predetermined values. In the same manner, the relative heights of the frame side member 21A and the cross member 41B are determined to be predetermined values.

What is claimed is:

1. A vehicle skeleton structure comprising:
   a frame having a polygonal shape; and
   a skeletal component that is integrally molded and assembled to the frame, wherein:
   the frame includes a pair of side members extending in a vehicle front-rear direction, the side members each having an opening provided in a longitudinal end portion,
   a pair of cross members extending in a vehicle width direction, the cross members each having an opening provided in a longitudinal end portion, and
   a joint block that joins one of the side members and one of the cross members;
   the skeletal component has a pair of abutment surfaces set for each of the side members;
   the joint block includes a cross arm to be inserted into the opening of one of the cross members; and
   the cross arm is provided with an adhesive surface along the vehicle width direction.

2. The vehicle skeleton structure according to claim 1, wherein:
   walls surrounding the opening of one of the cross members include a covered surface to be covered by the skeletal component and an exposed surface; and
   an adhesive injection hole is drilled in the exposed surface.

3. The vehicle skeleton structure according to claim 1, wherein:
   the adhesive surface of the cross arm is provided over an entire circumference of the cross arm; and
   an injection groove is provided over an entire circumference in the adhesive surface.

4. The vehicle skeleton structure according to claim 1, wherein:
   the joint block includes a side arm to be inserted into the opening of one of the side members;
   a flat surface is provided at a bottom portion of the cross arm and the side arm; and
   the flat surface of the cross arm and the flat surface of the side arm are provided on the same plane.

5. The vehicle skeleton structure according to claim 1, wherein:
   the cross arm includes an extension portion extending from the adhesive surface;
   a projecting piece is provided on a lower surface of the extension portion; and
   an insertion hole into which the projecting piece is insertable is drilled in a bottom wall, of walls surrounding the opening of one of the cross members.

* * * * *